(12) United States Patent
Imbornone et al.

(10) Patent No.: US 11,060,523 B1
(45) Date of Patent: Jul. 13, 2021

(54) VACUUM PUMP SILENCER

(71) Applicant: Eagletree-Pump Acquisition Corp., New York, NY (US)

(72) Inventors: Vincent Imbornone, Union, NJ (US); Thomas Stergioulas, Hackettstown, NJ (US); Raphael Sagher, Alpine, NJ (US)

(73) Assignee: Airtech Group, Inc., Rutherford, NJ (US)

( * ) Notice: Subject to any disclaimer, the term of this patent is extended or adjusted under 35 U.S.C. 154(b) by 77 days.

(21) Appl. No.: 16/358,306

(22) Filed: Mar. 19, 2019

(51) Int. Cl.
| | |
|---|---|
| *F04C 29/06* | (2006.01) |
| *F04B 39/00* | (2006.01) |
| *F04D 29/66* | (2006.01) |
| *F01N 1/08* | (2006.01) |
| *F01N 1/16* | (2006.01) |
| *F04C 29/00* | (2006.01) |
| *F16K 15/14* | (2006.01) |

(52) U.S. Cl.
CPC ............ *F04C 29/065* (2013.01); *F01N 1/083* (2013.01); *F01N 1/084* (2013.01); *F01N 1/089* (2013.01); *F01N 1/163* (2013.01); *F01N 1/166* (2013.01); *F04B 39/0055* (2013.01); *F04B 39/0061* (2013.01); *F04B 39/0066* (2013.01); *F04C 29/0035* (2013.01); *F04C 29/06* (2013.01); *F04C 29/061* (2013.01); *F04C 29/068* (2013.01); *F04D 29/663* (2013.01); *F04D 29/665* (2013.01); *F01N 2470/02* (2013.01); *F01N 2490/155* (2013.01); *F04C 2220/10* (2013.01); *F04C 2270/12* (2013.01); *F04C 2270/13* (2013.01); *F05B 2260/964* (2013.01); *F16K 15/148* (2013.01)

(58) Field of Classification Search
CPC ... F01N 1/089; F01N 1/10; F01N 1/02; F01N 2490/155; F01N 1/08; F01N 1/083; F01N 1/166; F01N 2470/02; F01N 2490/08; F01N 1/163; F01N 1/084; F01N 2470/00; F04B 39/0055; F04B 39/0066; F04B 39/0061; F04D 29/665; F04D 29/663; F04C 29/068; F04C 29/061; F04C 29/065; F04C 2270/12; F04C 2270/13; F04C 29/0035; F04C 29/06
See application file for complete search history.

(56) References Cited

U.S. PATENT DOCUMENTS

| | | | | |
|---|---|---|---|---|
| 1,927,947 | A * | 9/1933 | Newell | F04B 39/0055 |
| | | | | 181/278 |
| 3,219,141 | A * | 11/1965 | Williamitis | F01N 1/165 |
| | | | | 181/269 |
| 4,346,783 | A * | 8/1982 | Scarton | F01N 1/08 |
| | | | | 181/230 |
| 4,580,719 | A * | 4/1986 | Long, Jr. | G05D 23/1333 |
| | | | | 236/101 B |
| 5,208,429 | A * | 5/1993 | Field | F02M 35/1222 |
| | | | | 181/229 |

(Continued)

*Primary Examiner* — Peter J Bertheaud
(74) *Attorney, Agent, or Firm* — Galgano IP Law PLLC; Thomas M. Galgano

(57) ABSTRACT

A silencer for vacuum pumps which allows only for unidirectional flow and which reduces the noises caused by the air discharged at the exhaust of said pump. The silencer features baffles to divert and disrupt the flow and an umbrella check valve to ensure the unidirectionality of the discharge flow.

17 Claims, 6 Drawing Sheets

(56) References Cited

U.S. PATENT DOCUMENTS

| | | | | |
|---|---|---|---|---|
| 5,917,161 A * | 6/1999 | Fuhrmann | ............... | F01N 1/166 |
| | | | | 181/237 |
| 6,065,564 A * | 5/2000 | Uegane | ................... | F01N 1/084 |
| | | | | 181/237 |
| 6,554,099 B2 * | 4/2003 | Uegane | ................... | B60K 13/04 |
| | | | | 181/275 |
| 2005/0061580 A1 * | 3/2005 | Wiemeler | ............... | F01N 1/165 |
| | | | | 181/254 |

* cited by examiner

VACUUM PUMP SILENCER

BACKGROUND OF THE INVENTION

1. Field of the Invention

The invention relates to the field of noise reducing devices for vacuum pumps. More particularly, it relates to a check valve-type silencer for vacuum pumps which is used to reduce the noise of the exhaust of vacuum pumps. The silencer also acts as a single direction check valve which prevents back pressure.

2. Description of Related Art

Silencers are a well-established technology in the field of discharge gas devices. Indeed, the noise produced by regenerative blowers such as vacuum pumps can cause inconvenience and need to be regulated for certain applications. Commonly, the main noise generated by a vacuum pump is caused by the discharge of the exhaust gas directly into the surrounding atmosphere or ambient environment. This noise can be reduced by different devices, e.g., mufflers, silencers, etc., that reduce noise to an acceptable limit. Most existing silencers for blowers or other discharge gas units are static assemblies with a cylindrical chamber that includes noise reducing material. As the gas enters the chamber, it is obstructed and diverted, then expelled at lower noise levels.

Accordingly, it is an object of the present invention to provide a novel silencer especially for vacuum pumps.

It is a further object of the present invention to provide such a novel silencer which is unidirectional and prevents the expelled flow from returning to the pump and causing back pressure.

It is also an object of the present invention to provide such a novel silencer for vacuum pumps which is relatively simple to use and construct, is highly effective in operation and economical to use and manufacture.

It is a more particular object of the present invention to provide a check valve silencer for vacuum pumps which obstruct and divert the flow coming from the exhaust of a vacuum pump using an umbrella check valve.

SUMMARY OF THE INVENTION

Certain of the foregoing and related objects are attained according to the present invention by the provision of a silencer for reducing the noise generated by the fluid discharge at the discharge port of a vacuum pump, comprising a housing having an inlet port and outlet port for connection, respectively, to the exhaust of the vacuum pump and to the system to which the latter is connected and an internal hollow chamber extending between said inlet and outlet ports; a separator wall disposed between inlet and outlet ports and dividing said internal cavity into a front baffle chamber and a rear expansion chamber which wall has a plurality of throughbores extending therethrough to allow for fluid flow from said front chamber to said rear expansion chamber; means for obstructing the discharge flow mounted in said front baffle chamber; and an umbrella-type check valve for obstructing the discharge flow in said rear chamber.

Preferably, the means for obstructing comprises a circular slotted disc which advantageously has a cross-shaped slot and is made of PTFE. Desirably, the means for obstructing may also comprise an elongated tubular perforated baffle which preferably is attached to said separator wall and advantageously is cylindrical.

In a preferred embodiment of the invention, the slotted disc is located in said front baffle chamber adjacent to said inlet port and wherein said baffle abuts said slotted disc. The check valve is preferably mounted on said separator wall and has a movable diaphragm which is movable between a normal, inoperative position, in which it covers and blocks said throughholes in said separator wall to prevent discharge flow into said rear chamber, and an operative position, in which the force of said discharge flow moves said diaphragm away from said separator wall and throughholes to allow the discharge flow to pass through said throughholes and around said diaphragm to allow the discharge flow to enter said rear chamber and exit via said housing outlet port. Most desirably, the housing is comprised of two housing parts releasably fastened together which advantageously comprise a generally conical front end and a generally cylindrical rear end.

In operation of the preferred embodiment of the invention, the fluid expelled from the vacuum pump is first obstructed by the slotted PTFE disk which acts as an obstruction and a first barrier to reduce the noise. Afterward, the flow is diverted by the tubular baffle and proceeds through the perforated seat of the umbrella check valve. Once through, the fluid pushes the umbrella from the seat, creating a gap, which then leads the flow to exit via the outlet port. As can be appreciated, the general assembly provides many obstructing and diverting steps to the flow which consequently reduces the noise.

Any back pressure is thus prevented by the umbrella check valve installed inside the silencer housing. The umbrella type valve is a diaphragm disk made of an elastomeric material whose circumferential edge portion is lifted from its seat as it is pushed by the flow and forms a gap about its periphery around which the flow may pass into the rear chamber and from there to the discharge port. The seat is defined by the rear side of the perforated separator wall on which the resilient, pliable umbrella disk is attached. This assembly therefore only allows for forward flow as backward flow would only create a sealing force on the diaphragm toward its seat.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

DETAILED DESCRIPTION OF THE PREFERRED AND ILLUSTRATED EMBODIMENT

Figure 1:
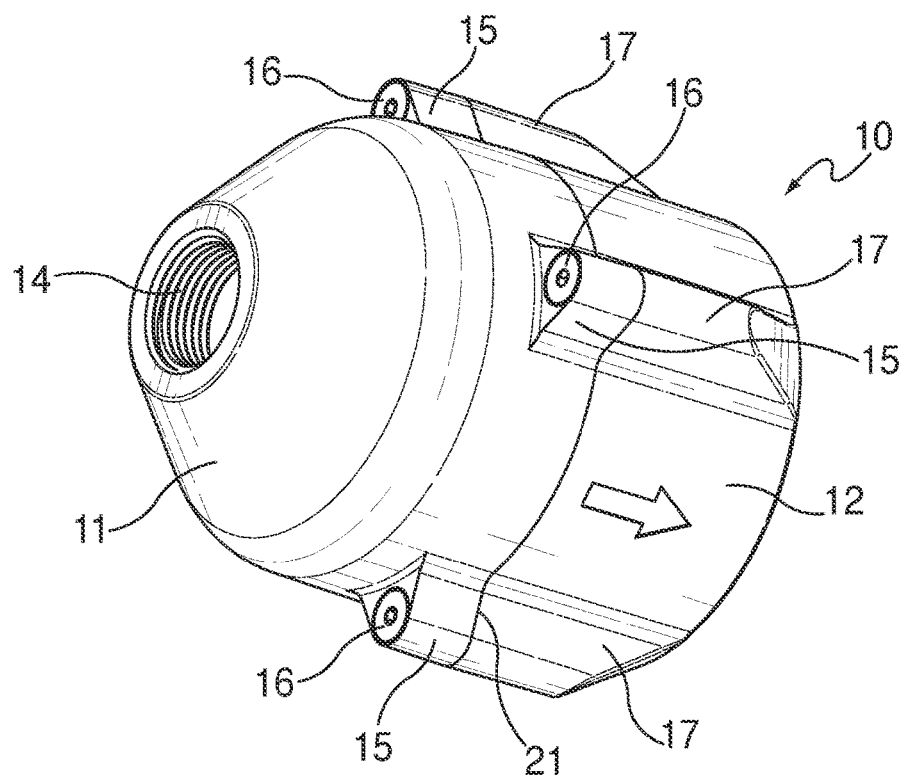
FIG. 1 is a front, side and bottom perspective view of a silencer for a vacuum pump embodying the present invention, from an inlet perspective.
Figure 2:
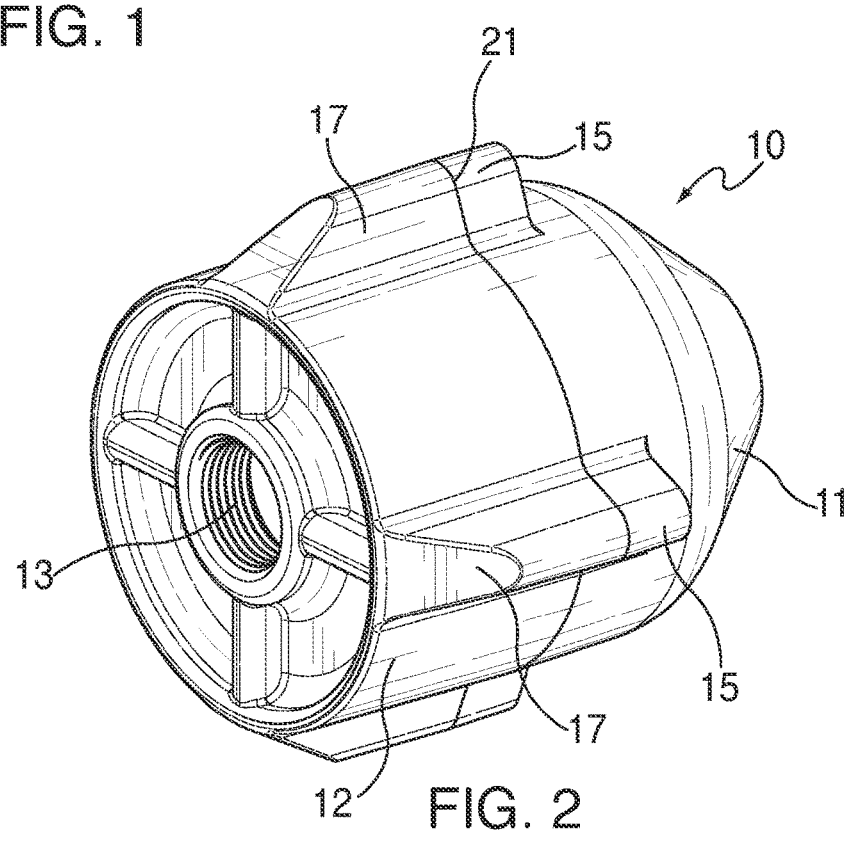
FIG. 2 is a rear, side, and bottom perspective view of the inside assembly of the silencer shown in FIG. 1, from the outlet perspective.

Turning now in detail to the drawings and, in particular FIG. 1 thereof, therein illustrated is a silencer embodying the present invention which includes a two-part housing generally designated by reference numeral 10 which includes a conical inlet portion 11 and a cylindrical outlet portion 12. The housing is intended for attachment to the exhaust port of a vacuum pump (not shown) via its inlet portion 11 which is screwed onto the discharge port of a vacuum pump or an adaptive fitting (not shown) by means of its female threaded internal bore 14 which defines an inlet opening of the silencer 10. Thus, the discharge fluid from the pump enters the silencer via its inlet opening 14 and ultimately exits the silencer at its female threaded central discharge port 13 formed in the rear wall of cylindrical outlet portion 12.

The two housing parts 11, 12 are attached to each other by screws 16 receivable in paired and aligned raised abutments 15, 17 formed on housing parts 11, 12, respectively, each having aligned central internally threaded bores (not shown) distributed equally along the circumference of the rearward cylindrical annular segment of conical inlet portion 11 and cylindrical annular outlet portion 12. The screw heads of screw 16 are located on the inlet portion 11 and are inserted into threaded holes in the outlet portion 12. As the screws 16 are threaded in place, they compress the abutting mating annular end faces of the two housing parts 11, 12, together along joint line 21.

Figure 3:
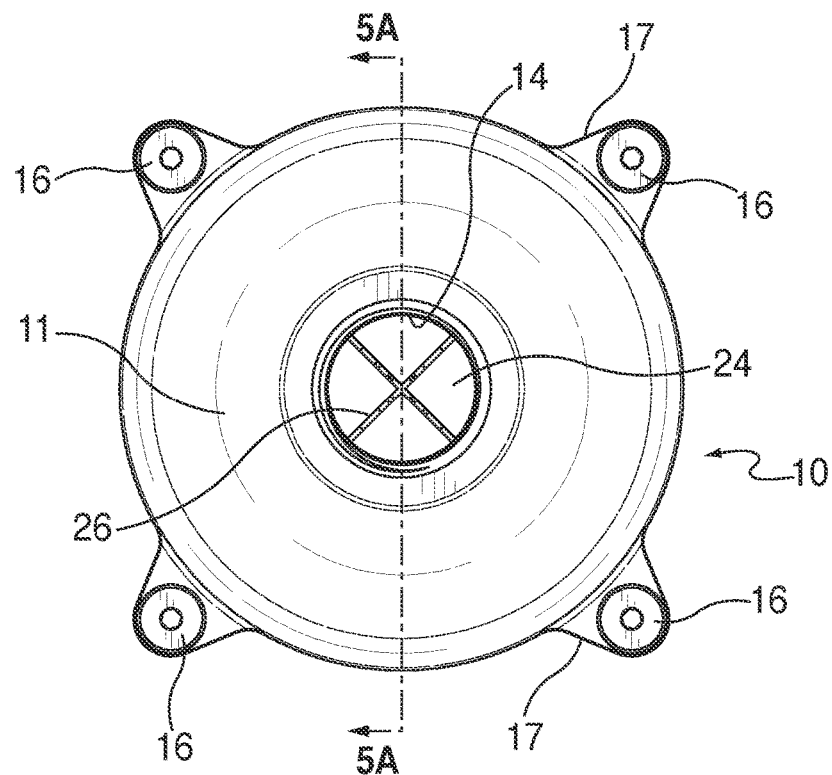
FIG. 3 is a front end elevational view of the silencer shown in FIG. 1.
Figure 4:
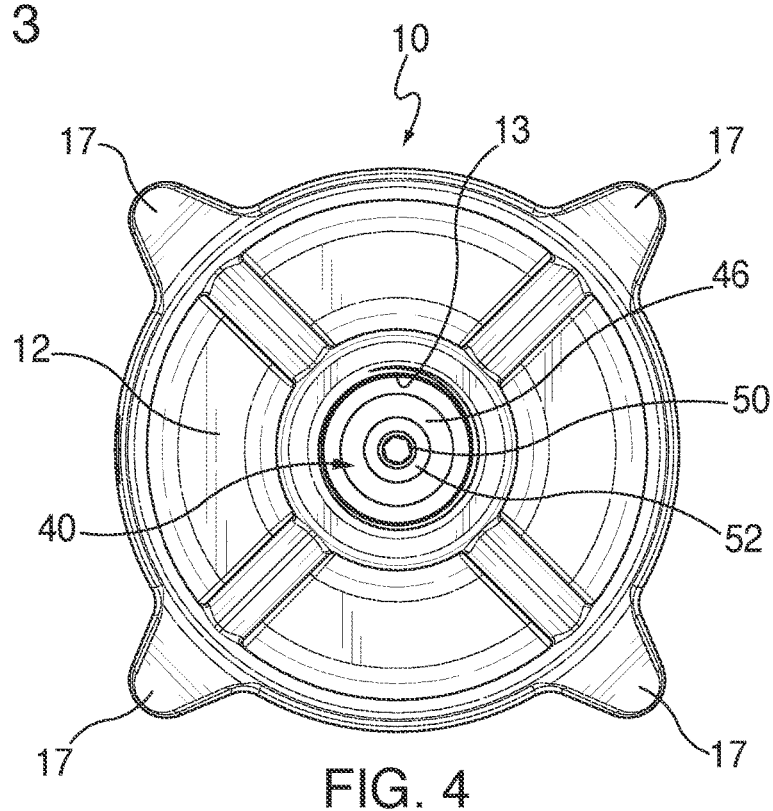
FIG. 4 is a rear end elevational view of the silencer shown in FIG. 1.
Figure 5A:
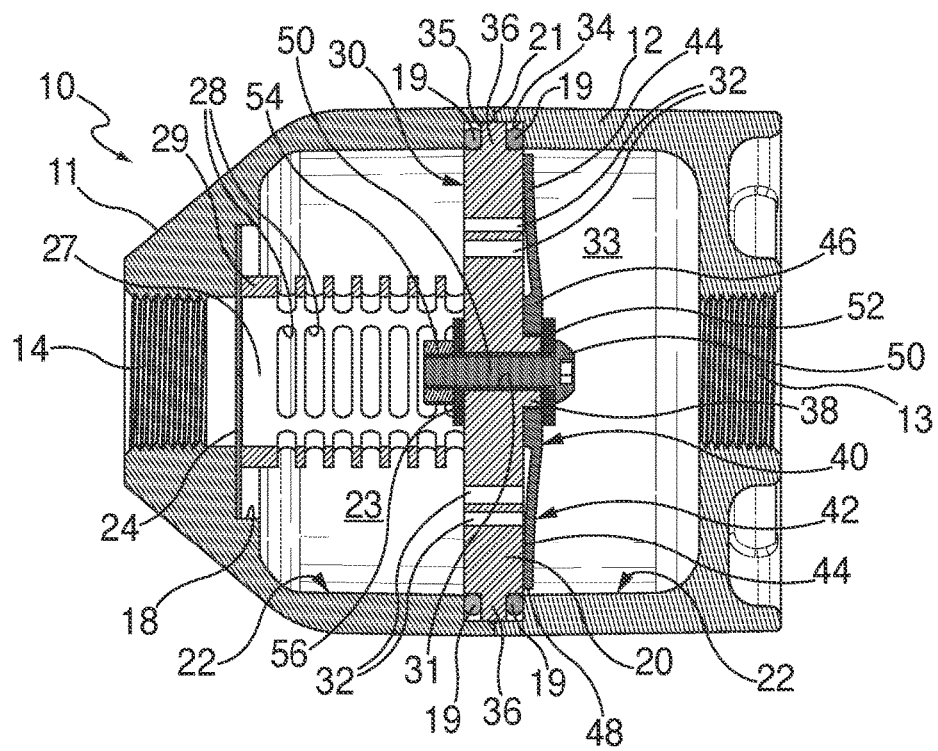
FIG. 5A is a cross-sectional view of the cylindrical vacuum pump silencer in its normal inoperative position taken along line 5A-5A of FIG. 3.
Figure 5B:
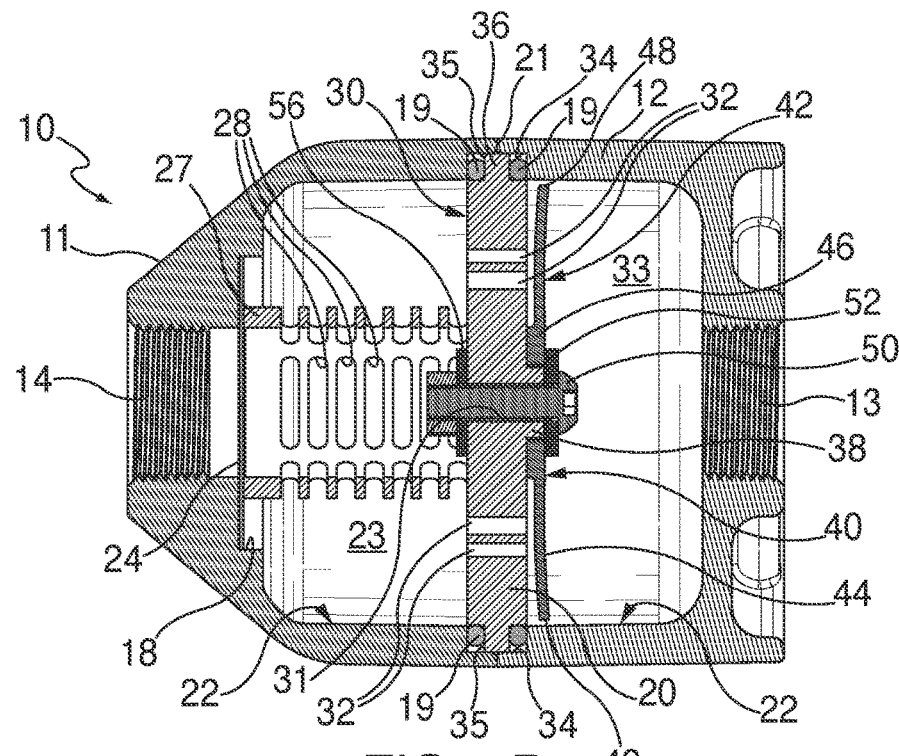
FIG. 5B is a cross-sectional view of the cylindrical vacuum pump silencer shown in FIG. 5A, in its operative position.
Figure 6:
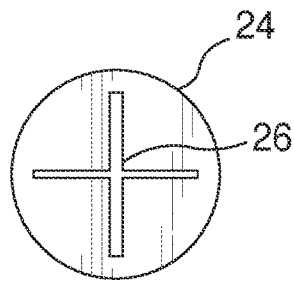
FIG. 6 is a front end elevational view of a disc disposed inside the silencer of FIG. 1 adjacent said inlet thereof.

The internal components of the silencer 10 are seen best in FIGS. 4-8. The two housing parts 11, 12 define and encompass a central chamber 22 in which the internal components are mounted. As shown in FIG. 3 and FIG. 6 silencer 10 preferably includes a circular disc 24 having a cross-shaped slit 26 formed therethrough. As shown in FIGS. 3, 5A and 5B, disc 24 is mounted adjacent inlet 14 of conical housing 11. It is mounted in an annular, recessed shoulder portion 18 of conical housing 11 adjacent the inner end of inlet port 14. The disc 24 is preferably made of PTFE (polytetrafluoroethylene) plastic and its purpose is to obstruct the discharge flow as it enters the silencer 10.

Figure 7:
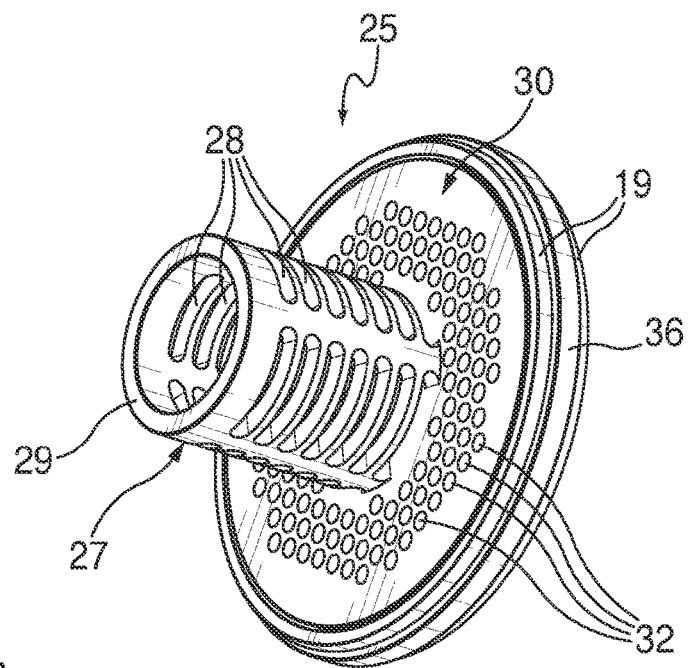
FIG. 7 is a front, side and bottom perspective view of the baffle and valve assembly disposed inside silencer of FIG. 1 downstream of the disc shown in FIG. 6.
Figure 8:
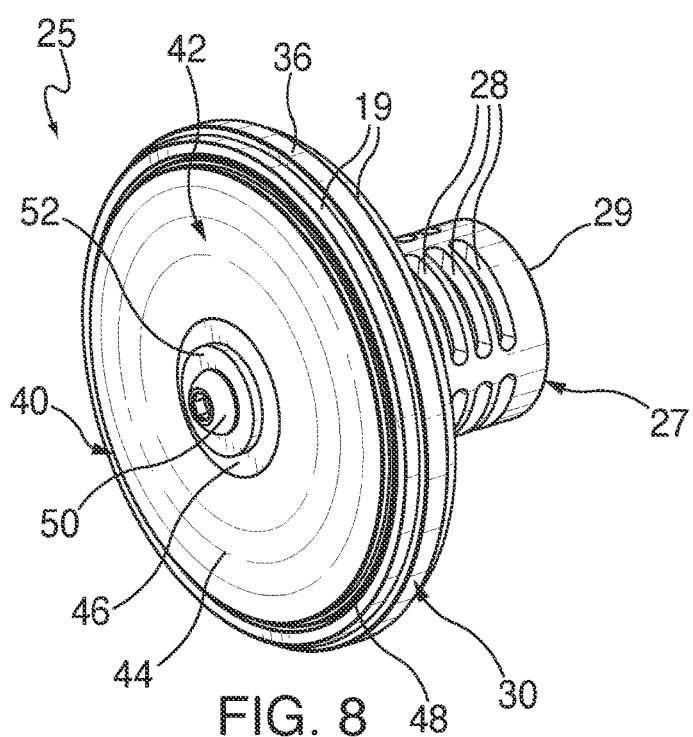
FIG. 8 is a rear, side and top perspective view of the baffle and valve assembly shown in FIG. 7.
Figure 9:
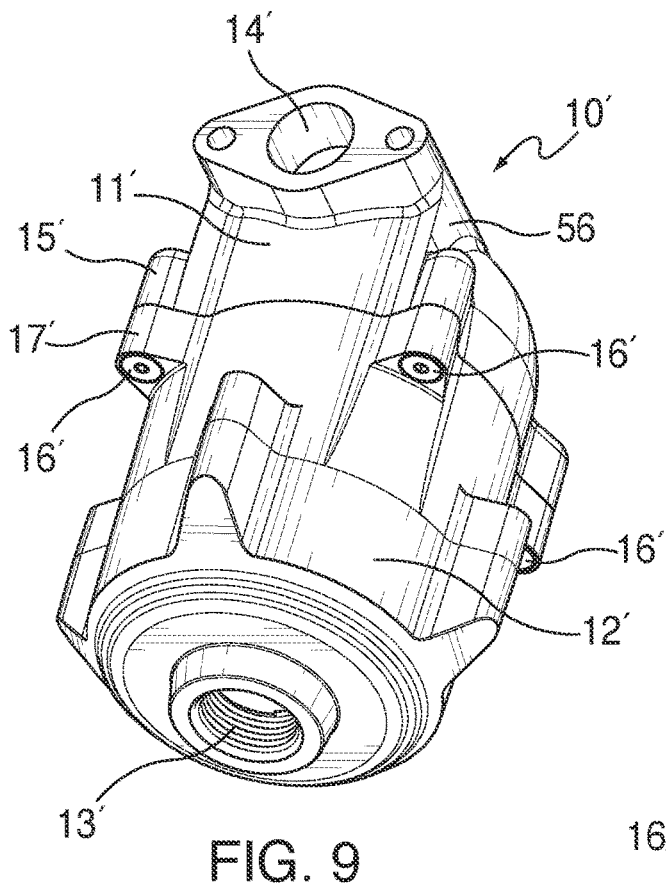
FIG. 9 is a rear, top and side perspective view of a further embodiment of a silencer embodying the present invention.
Figure 10:
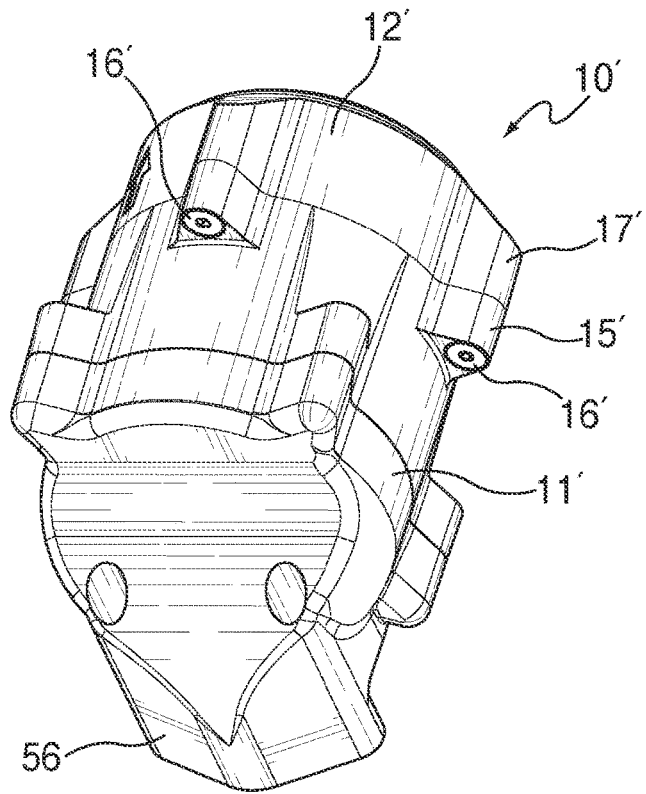
FIG. 10 is a front, bottom and side perspective view of the silencer shown in FIG. 9.
Figure 11:
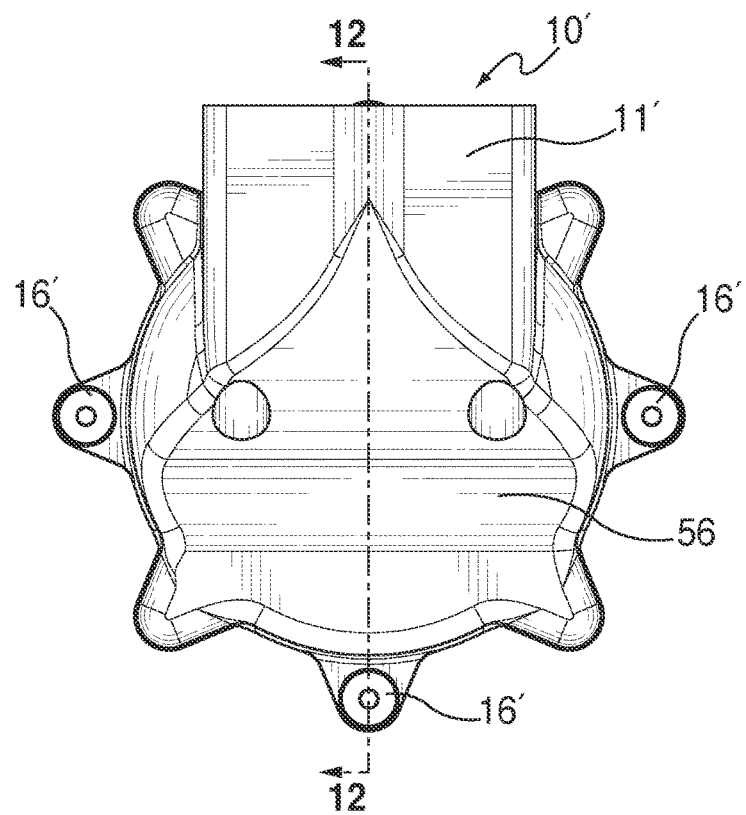
FIG. 11 is a front elevational view of the silencer shown in FIG. 9.
Figure 12:
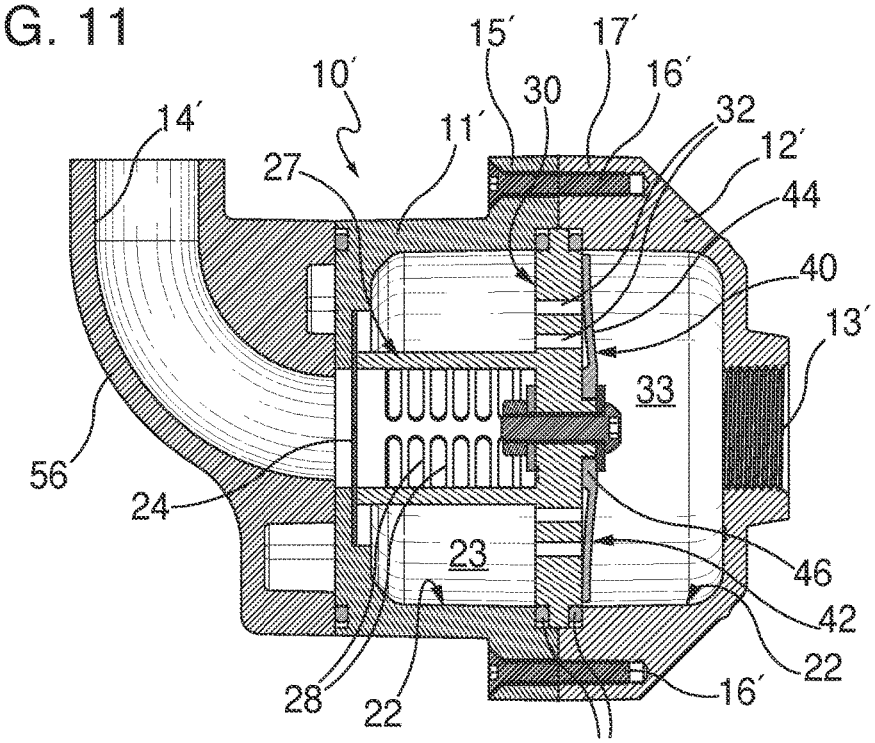
FIG. 12 is a cross-sectional view of the silencer taken along line 12-12 of FIG. 9.

As shown in FIGS. 7 and 8, silencer 10 also includes a combined baffle and valve assembly 25 mounted in front chamber 23 of central chamber 22 downstream of disc 24 which includes a tubular (preferably cylindrical) slotted or perforated baffle 27 which has a plurality of rows of parallel, spaced-apart slots 28 formed thereof. Preferably, baffle 27 has an inside diameter which is equal to the chamber of inlet 14. As shown in FIG. 5A, the front end 29 of baffle 27 is positioned to abut the rear face of disc 24, so that the discharge fluid passing through the cross-shaped slot 26, of disc 24 is then directed into the internal channel of baffle 27 and escapes via its circumferentially-spaced-apart slots 28. This causes the fluid as it passes through the baffle 27 and exits its radially-extending slots 28 to be diverted by a 90° turn, again reducing the noise that would be caused by a straight flow.

The opposite rear end of baffle 27 is connected to the center of a front side of a circular, disc-shaped divider or separator plate 30 which divides internal and central chamber 22 into a front chamber 23 and rear chamber 33. As shown in FIG. 7, plate 30 also has a multiplicity of rows of spaced-apart throughholes or throughbores 32 formed therethrough which allows the discharge flow to pass from front chamber 23 to rear chamber 33. Thus, here too, separating plate 30, like baffle 24, functions to disrupt the flow and again diverts it by a 90° turn as the flow passes through the separator plate 30.

As shown in FIGS. 5A and 5B, separator plate 30 is installed in internal central chamber 22 in an annular recess 34 in the abutting faces of housing portions 11 and 12, to divide internal chamber 22 into a front chamber 23 and a rear chamber 33. Preferably, circular separator plate 30 has a pair of recessed shoulder portions 35 adjacent to its periphery which defines a central, reduced neck portion 36 at its circumferential periphery which abuts housing parts 11, 12 at the joint 21 of their respective abutting annular end faces. As seen best in FIGS. 5A and 5B, the seal in between the mating faces of housing portions 11, 12 is enhanced by two identical 0-rings 19 mounted, respectively, on the pair of shoulders 35 on the front and rear faces of separator plate 30, adjacent the periphery thereof.

As shown in FIGS. 5A, 5B and 8, mounted on the rear side of separator plate 30 is an umbrella-type check valve, generally designated by reference numeral 40. Typically, conventional umbrella check valves are uni-directional and open as the flow pressure pushes an "umbrella shaped" diaphragm made of flexible material which rests on a perforated seat. As the fluid is pushed through the inlet of the valve, it is forced through a perforated wall on which the umbrella diaphragm rests. The fluid pushes the diaphragm from its seat in the same direction as the flow and creates a gap at its periphery which allows flow discharge through the gap. However, the umbrella diaphragm is positioned on the perforated wall such that fluid coming from an opposite direction can only compress the diaphragm further on the wall which then acts as a tight barrier to unwanted back flow. Hence, the uni-directionality of the valve. The umbrella check valve 40 as used in this invention obstructs the flow, therefore reducing the noise, and also avoiding the back flow return of the fluid into the pump.

More particularly, as seen best in FIGS. 5A and 5B, check valve 40 has an enlarged central annular hub 46 from which radially extends a flexible "umbrella-shaped" diaphragm 42 which is received on and secured to a raised central hub 38 on the rear side of separator plate 30 by a threaded bolt 50 and washer 52. Bolt 50 extends through a central throughbore 31 of separator plate 30 and is threadably attached to a nut 54 and washer 56 on the opposite side of separator plate 30. As seen best in FIG. 7 and FIGS. 5A and 5B, the throughbores 32 in separator plate 30 do not extend radially to the outer portions and edge 36 of separator plate 30.

As shown in FIG. 5A, when bolt 50 is tightened, the peripheral umbrella-like skirt portion 44 of diaphragm 42 extends radially outward from its raised central hub 46 and gradually and radially extends outward and towards separator plate 30 with its peripheral edge portion abutting separator plate 30 at a point generally beyond the radial extent to which the throughbores 32 extend. The diaphragm's peripheral edge 48 is spaced from the housing 12 inner face to allow the discharge flow to escape through the gap therebetween when said edge 48 is raised off the separator wall 30 by the discharging flow as shown in FIG. 5B.

Thus, as shown in FIG. 5B, in operation, the fluid passes through the throughbores 32 in the separator plate 30 and pushes on the umbrella diaphragm 42. As a result, the inner face of the peripheral edge portion 48 of umbrella diaphragm 42 normally abutting and in flush engagement with the rear face of separator 30 is pushed away from the separator plate 30 and creates a passage around the peripheral edge 48 of skirt of diaphragm 42 for the gas flow to escape. Finally, the fluid enters the rear expansion chamber 33 and escapes through the outlet port 13.

Alternately, if the system or apparatus to which the vacuum pump is connected provides back pressure, this counterflow would enter in the rear expansion chamber 33 without being able to proceed past the umbrella diaphragm 42. As the backpressure enters, it would simply push the diaphragm 42 and its skirt 44 toward the separator plate 30, thus blocking its holes 32. This feature allows it to protect the vacuum pump from backpressure of the system to which it is connected.

FIGS. 9-12 illustrate a different housing configuration for the silencer 10. The outlet housing 11' is in this case flat and connects to an elbow-shaped flange 56 which diverts the flow by 90 degrees before passing through the silencer 10'. Aside from this different configuration of housing 12' and opening 14', the internal components and parts and operation of the silencer 10' is otherwise the same as that shown and described in reference to silencer 10 shown in FIGS. 1-8 and therefor their description and manner of operation are not repeated herein.

While particular embodiments of the invention have been described and illustrated, it is not intended that the invention be limited thereto, as it is intended that the invention be as broad in scope as the prior art will allow and that the specification be read likewise.

For example, the size, shape and configuration of the housing and its parts can, of course, be modified to suit particular applications of the silencer. In addition, the housing parts while preferably made of metal, can be composed of synthetic plastic and/or composite materials as desired. Moreover, the preferred means of attachment utilizing internally threaded inlet and discharge ports can be substituted with other conventional quick-connect and disconnect attachment means as may be more suitable for some applications.

It will therefore be appreciated by those skilled in the art that other modifications could be made thereto without departing from the spirit and scope of the invention.

What is claimed is:

1. A silencer for reducing the noise generated by the fluid discharge at the discharge port of a vacuum pump, comprising:
    a housing having an inlet port and outlet port for connection, respectively, to the exhaust of the vacuum pump and to a system port to which the latter is connectable and an internal hollow chamber extending between said inlet and outlet ports;
    a single separator wall disposed between said inlet and outlet ports and dividing said internal hollow chamber into a single front baffle chamber and a single rear expansion chamber, wherein said separator wall has a multiplicity of spaced-apart throughbores extending therethrough to allow for fluid flow from said front baffle chamber to said rear expansion chamber;
    means for obstructing and diverting the discharge flow mounted in said front baffle chamber, said means for obstructing and diverting comprising an elongated tubular perforated baffle mounted between said inlet port and said separator wall and causing the fluid flow to be successively diverted twice by a generally 90° turn to enable the fluid flow to enter said multiplicity of throughbores in said separator wall; and
    an umbrella-type check valve for obstructing the discharge flow in said rear expansion chamber mounted between said separator wall and said outlet port.

2. The silencer according to claim 1, wherein said means for obstructing and diverting additionally comprises a circular slotted disc.

3. The silencer according to claim 2, wherein said slotted disc has a cross-shaped slot.

4. The silencer according to claim 3, wherein said disc is made of polytetrafluoroethylene.

5. The silencer according to claim 1, wherein said elongated tubular perforated baffle is attached to said separator wall.

6. The silencer according to claim 5, wherein said elongated tubular perforated baffle is cylindrical.

7. The silencer according to claim 6, wherein said means for obstructing and diverting additionally including a slotted disc located in said front baffle chamber adjacent to said inlet port and wherein said elongated tubular perforated baffle abuts said slotted disc.

8. The silencer according to claim 1, wherein said check valve is mounted on said separator wall and has a movable diaphragm which is movable between a normal, inoperative position, in which it covers and blocks said throughbores in said separator wall, to prevent discharge flow into said rear expansion chamber, and an operative position, in which the force of said discharge flow moves said diaphragm away from said separator wall and throughbores to allow the discharge flow to pass through said throughbores and around said diaphragm to allow the discharge flow to enter said rear expansion chamber and exit via said housing outlet port.

9. The silencer according to claim 8, wherein said housing is comprised of two housing parts releasably fastened together.

10. The silencer according to claim 9, wherein said two housing parts comprise a generally conical front end portion and a generally cylindrical rear end portion.

11. A silencer for reducing the noise generated by the fluid discharge at the discharge port of a vacuum pump, comprising:
    a housing having an inlet port and outlet port for connection, respectively, to the exhaust of the vacuum pump and to a system port to which the latter is connectable and an internal hollow chamber extending between said inlet and outlet ports;
    a separator wall disposed between said inlet and outlet ports and dividing said internal hollow chamber into a front baffle chamber and a rear expansion chamber, wherein said separator wall has a plurality of throughbores extending therethrough to allow for fluid flow from said front baffle chamber to said rear expansion chamber;
    means for obstructing the discharge flow mounted in said front baffle chamber, said means for obstructing being mounted between said inlet port and said separator wall comprising an elongated tubular perforated baffle having a rear end abutting said separator wall, and a slotted disc located in said front baffle chamber adjacent to said inlet port which abuts a front end of said elongated tubular perforated baffle; and an umbrella-type check valve for obstructing the discharge flow mounted in said rear expansion chamber.

12. The silencer according to claim 11, wherein said slotted disc is circular and said elongated tubular perforated baffle is cylindrical.

13. The silencer according to claim 12, wherein said slotted disc has a cross-shaped slot.

14. The silencer according to claim 11, wherein said disc is made of polytetrafluoroethylene.

15. The silencer according to claim 11, wherein said check valve is mounted on said separator wall and has a movable diaphragm which is movable between a normal, inoperative position, in which it covers and blocks said plurality of throughbores in said separator wall, to prevent discharge flow into said rear expansion chamber, and an operative position, in which the force of said discharge flow moves said diaphragm away from said separator wall and throughbores to allow the discharge flow to pass through said throughbores and around said diaphragm to allow the discharge flow to enter said rear expansion chamber and exit via said housing outlet port.

16. The silencer according to claim 15, wherein said housing is comprised of two housing parts releasably fastened together.

17. The silencer according to claim 16, wherein said two housing parts comprise a generally conical front end portion and a generally cylindrical rear end portion.

\* \* \* \* \*